United States Patent
Ingelman et al.

(10) Patent No.: US 6,793,809 B2
(45) Date of Patent: Sep. 21, 2004

(54) PIPE SYSTEM FOR RECEIVING AND TRANSPORTING LIME SLUDGE FROM A WHITE LIQUOR FILTER

(75) Inventors: Magnus Ingelman, Karlstad (SE); Jan Tjernberg, Forshaga (SE)

(73) Assignee: Kvaerner Pulping AB

( * ) Notice: Subject to any disclaimer, the term of this patent is extended or adjusted under 35 U.S.C. 154(b) by 0 days.

(21) Appl. No.: 10/250,885

(22) PCT Filed: Feb. 5, 2002

(86) PCT No.: PCT/SE02/00195

§ 371 (c)(1),
(2), (4) Date: Nov. 3, 2003

(87) PCT Pub. No.: WO02/063095

PCT Pub. Date: Aug. 15, 2002

(65) Prior Publication Data

US 2004/0069721 A1 Apr. 15, 2004

(30) Foreign Application Priority Data

Feb. 7, 2001 (SE) .............................. 0100411

(51) Int. Cl.⁷ .......................... D21C 9/18; C02F 11/14; B01D 33/21
(52) U.S. Cl. ....................... 210/143; 210/188; 210/259; 210/396; 210/397; 210/928
(58) Field of Search .................. 210/97, 143, 188, 210/252, 259, 330, 331, 359, 396, 397, 928

(56) References Cited

U.S. PATENT DOCUMENTS

| | | | | | |
|---|---|---|---|---|---|
| 2,539,732 | A | * | 1/1951 | Donohue | 210/522 |
| 3,495,254 | A | * | 2/1970 | Clemens | 210/522 |
| 4,264,445 | A | * | 4/1981 | Lumikko et al. | 210/323.2 |
| 4,929,355 | A | | 5/1990 | Ragnegård | |
| 5,151,176 | A | * | 9/1992 | Strid et al. | 210/178 |
| 5,227,064 | A | * | 7/1993 | Strid | 210/327 |
| 5,705,031 | A | * | 1/1998 | Angevine | 162/30.11 |
| 5,759,397 | A | * | 6/1998 | Larsson et al. | 210/331 |
| 5,788,813 | A | * | 8/1998 | Engdahl et al. | 162/29 |
| 5,900,158 | A | * | 5/1999 | Ruokolainen et al. | 210/772 |

* cited by examiner

Primary Examiner—Fred G. Prince
(74) Attorney, Agent, or Firm—Rolf Fasth; Fasth Law Offices

(57) ABSTRACT

The pipe system is for receiving and transporting lime sludge from a filter medium in a continuously operating pressurized filter 1 in a causticizing process, where lime sludge is scraped off from the filter medium 2 and falls down into receiving chutes 4a for the lime sludge. Conventional storage tanks for scraped-off lime sludge and their mechanical agitators are thus replaced by a pipe system 11 where the pipe system does not have a mechanical agitator at all but has a flow cross section which maintains a flow rate in the lime sludge so that sedimentation of the lime sludge does not take place from the receiving chute 4a to the feed-out opening 30 of the pipe system.

16 Claims, 2 Drawing Sheets

PIPE SYSTEM FOR RECEIVING AND TRANSPORTING LIME SLUDGE FROM A WHITE LIQUOR FILTER

PRIOR APPLICATION

This application is a U.S. national phase application based on International Application No. PCT/SE02/00195, filed 5 Feb. 2002, claiming priority from Swedish Patent Application No. 0100411-8, filed 7 Feb. 2001.

TECHNICAL FIELD

The invention relates to a pipe system for receiving and transporting lime sludge and mud from a filter medium in a continuously operating filter in a causticizing process, in which white liquor is separated from the lime sludge.

STATE OF THE ART

The green liquor entering the causticizing process consists fundamentally of sodium carbonate. In the process, the green liquor is made to react with burnt lime, calcium carbonate (lime sludge) and sodium hydroxide (white liquor) being formed. The white liquor is filtered off in tube filters or disc filters, the latter in particular usually being of the pressurized type, after which the white liquor is reused in the sulphate process for cooking pulp wood chips. The lime sludge obtained from filtration is burnt so as to form burnt lime again.

Modern effective filtration arrangements for white liquor filtration produce lime sludge/filter cakes with relatively high dry contents but in which the lime sludge cakes, after they have been removed from the filter medium, constitute a material with highly adhesive properties. The material of the lime sludge cakes therefore has a tendency to adhere to the inner walls in the chute(s) via which it is transported away from the filter medium. This can give rise to acute operational stoppages or stoppages for cleaning on account of clogging, which reduces the capacity of the filtration arrangements and can cause problems and lead to other disadvantages.

The cleaning of ducts through which adhesive substances are transported can be effected by, for example, manual cleaning or automatic cleaning. Manual cleaning has many obvious drawbacks such as operational stoppages or partial operational stoppages and a poor working environment. Automatic cleaning can be performed using well-known methods such as, for example, with brushes, beating tools, ultrasound, steam-jetting, and liquid application where this is possible.

In continuously operating filtration arrangements for liquid suspensions such as, for example, those described in SE-C-463771 (=U.S. Pat. No. 4,929,355), a filter cake in the form of lime sludge is formed on a filter medium. This lime sludge is scraped off by doctors (knives) and drops down into receiving chutes, in which further dilution by dilution liquid is essential for it to be possible to transport the lime sludge onward. In said SE-C-463771, a feed-out screw is shown directly after the feed-out chutes in one embodiment, which screw feeds onward to a feed-out valve arrangement. In another embodiment shown, this arrangement is illustrated in the form of a level-regulated storage tank, in which there is a mechanical agitator. Some embodiments of this process comprise a sloping collecting pipe after the feed-out chutes, which collecting pipe leads to the storage tank. In order to avoid sedimentation in the sloping pipe, the lime sludge slurry is circulated from the bottom of the storage tank to the highest point of the sloping collecting pipe.

A corresponding solution with a storage tank and mechanical mixer is disclosed in U.S. Pat. No. 5,151,176. In other applications with tube filters as well (see U.S. Pat. No. 4,264,445), use is made of a storage tank and a mechanical mixer in order for it to be possible to deal with the filter cake taken out of a pressurized tube filter. The bulky storage tank and the mechanical agitator arranged therein were considered necessary in order for it to be possible to keep the lime sludge well mixed with added dilution liquid and to prevent sedimentation of the lime sludge.

The known art has led to handling systems for the lime sludge being unnecessarily expensive and space-consuming. Conventionally employed treatment vessels with mechanical agitators for receiving the lime sludge resulted in considerable costs. In the case of application in a white liquor filter with a relatively low capacity of 2,500 $m^3/24$ hrs, and a vessel with dimensions of 1900×2800 (diameter×height), the cost can be in the order of SEK 800,000 (approximately US$ 100,000). In a white liquor filter with a higher capacity of 8,000 $m^3/24$ hrs, and a vessel with dimensions of 2800× 3300 (diameter×height), the cost can be in the order of SEK 1,500,000 (approximately US$ 200,000).

Another disadvantage is that the mechanical agitators, in particular when applied in pressurized white liquor filters, have to be provided with packing boxes, which often lead to leakage problems.

The space requirement for storage tanks also limits the possibilities of structural alterations in existing installations where available space does not always allow the storage tank to be positioned adjacent to the filter, or results in the filter and the storage tank having to be located on different floors in the installation. In most cases, the storage tanks used in white liquor filtration have been virtually the same size as the white liquor filter itself, which is in itself very space-consuming.

BRIEF DESCRIPTION OF THE INVENTION

One object of the invention is to provide a system for receiving and transporting lime sludge from a filter medium in a continuously operating pressurized filter in a causticizing process, in which white liquor is separated from the lime sludge, and in which the system can be minimized in terms of size and cost at the same time as the conventionally used mechanical agitators can be dispensed with entirely, notwithstanding the strong tendency of the lime sludge to adhere to the walls in the handling system.

Another object is to obtain a system in which the dry content can be kept high in the system, which high dry content has not been considered possible in the large storage tanks as the lime sludge is to be kept in a uniform solution throughout the storage tank. The total quantities to be handled are then smaller, which results in considerable savings on pipeline systems and associated equipment.

Another object is to permit structural alterations in existing installations in which the available space is limited, it being possible then to arrange high-performance filter equipment in a small available space.

In a preferred embodiment, the risk of sedimentation in the system is reduced by using forced recirculation which affords an increased speed throughout the volume of the lime sludge mixture received. In an advantageous embodiment, a modified recirculation principle can be used in order to keep all the receiving chutes free from accumulations of lime sludge without having to dilute the lime sludge further with dilution liquid. In this embodiment, the storage tank can be minimized or eliminated completely.

Further characteristics, aspects and advantages of the invention emerge from the patent claims below and from the following description of a number of possible embodiments.

DETAILED DESCRIPTION OF AN EMBODIMENT OF THE INVENTION

Figure 1:
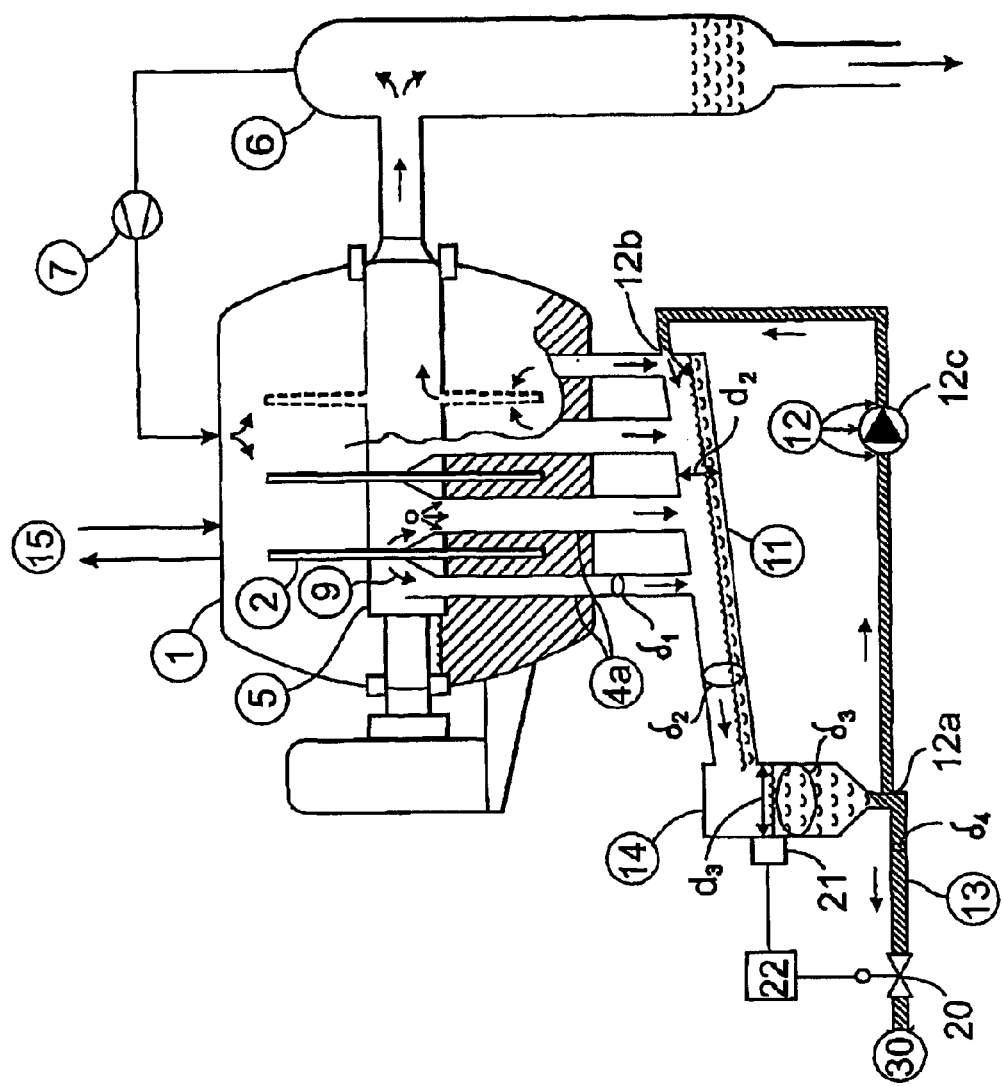
FIG. 1 shows a first variant of the white liquor filter according to the invention.
Figure 2:
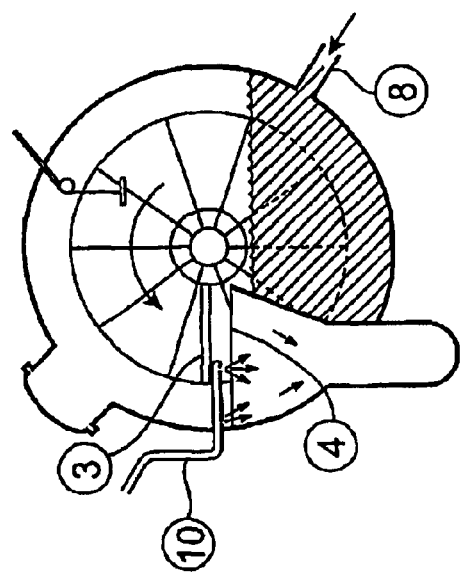
FIG. 2 shows a side view of the white liquor filter in FIG. 1.

A pressurized white liquid filter according to the invention is shown in FIG. 1 and in cross section in FIG. 2. The pressurized filter vessel 1 is fed with unfiltered liquid in the form of white liquor mixed with lime sludge via the inlet 8. The unfiltered liquid forms a liquid level inside the filter which reaches a level just below the shaft 5 of the filter, and not above the inlet opening of a receiving chute for the lime sludge, which is described below.

Arranged on the shaft is a number of disc-shaped filter elements 2 which are each covered with a filter medium, in most cases in the form of a fine-meshed cloth. The filter consists of at least two discs covered with filter medium and arranged on a hollow rotating shaft. In certain applications, as many as fourteen discs may be used. FIG. 1 shows 3 discs, one of which is concealed. White liquor is separated from the lime sludge by withdrawal through the filter medium of the disc filter element and is conveyed out of the filter via the hollow shaft, each disc filter element comprising stripping means interacting with the filter medium for freeing lime sludge accumulated on the filter medium, and a receiving chute being arranged with a receiving opening under each stripping means, and between two discs, so that each receiving opening collects lime sludge from two filter surfaces.

The white liquor is separated during filtration through the filter medium and is conducted via the inside of the filter element down to the hollow shaft 5 and onward to the gas separation vessel 6. The hollow shaft 5 can preferably be divided into sections, so that the hollow space in the shaft is made up of cake-slice-shaped spaces, seen in cross section through the axis.

A blower 7 is connected to the top of the vessel 6 and conducts gas back to the filter vessel 1 for pressurization of the process. Agitation (not shown) of unfiltered liquid also takes place in the filter for the purpose of preventing sedimentation. The agitation can be effected by means of, for example, blowing in air or liquid, and with or without ejectors.

The shaft 5 is rotated continuously by a motor, a deposit of lime sludge being built up gradually on the filter medium as the white liquor passes through the filter medium. The filter normally operates with a precoat layer which is maintained intact during the majority of the operating time. However, the invention also functions on filters which operate without a precoat covering.

The lime sludge, which is deposited on the precoat or directly on the filter medium, is scraped off by a knife 3 (doctor) which is arranged above the level of the unfiltered liquid, and it then drops down into a receiving chute 4 which likewise has its opening above the level of the unfiltered liquid. Located in the receiving chute are nozzles for dilution liquid 10, which dilute the stripped dry lime sludge to a dry content of at least 15%, preferably more than 20%, and typically in the range 25–30%. Dilution makes it possible to counteract to a certain extent clogging of the receiving chute.

In conventional white liquor filters, the receiving chute opens, via a sloping collecting pipe, in a storage vessel of considerable volume, in which a mechanical agitator is also arranged, in most cases in the form of a motor-driven propeller, which is driven continuously so as to avoid sedimentation and therefore keep the lime sludge in solution. In these conventional systems as well, a certain amount of the lime sludge being mechanically agitated is recirculated to the collecting pipe in order that the latter does not become clogged by sedimented lime sludge.

In accordance with the invention, the storage vessel receiving the lime sludge is thus replaced by a pipe system 11 which is common to the receiving chutes 4 and has a flow cross section which maintains a good flow rate and in which there is no need for mechanical agitators. Each receiving chute has a flow cross section $\delta_1$, hereinafter referred to as the first flow cross section. The pipe system is arranged below the filter vessel 1 and connected to the respective receiving chutes, so that these chutes lead to the lime sludge dropping down vertically through the receiving chutes, without deflections and with contact with the walls in the chute being minimized, and on down to the pipe system 11. The connecting portion of the pipe system, the collecting pipe, to which the receiving chutes 4 are connected, is arranged essentially parallel to the shaft 5 of the filter, but with its downstream end, seen in the feed-out direction of the lime sludge, slightly lower than its upstream end. This connecting portion of the pipe system preferably has a circular cross section with a flow cross section $\delta_2$, hereinafter referred to as the second flow cross section. By virtue of this design, a natural drop for the collected lime sludge out towards the outlet is obtained.

The pipe system is designed in such a manner that, from the connection of the receiving chutes to the feed-out opening 30 of the pipe system, it has a flow cross section which maintains a good flow rate in the lime sludge, so that sedimentation of the lime sludge does not occur.

In the embodiment shown, the connecting portion in the pipe system for the receiving chutes has the same diameter $d_2$ over its extent, but variants with gradually increasing diameter can be used as, from each new receiving chute connected, seen in the feed-out direction of the lime sludge, a flow of diluted lime sludge is added. In this way, a good high flow rate can be maintained, and sedimentation can be avoided.

The connecting portion of the pipe system, which preferably has a circular flow cross section $\delta_2$, ends in a small downpipe 14 at its downstream end. The downpipe is suitably a vertically upright downpipe with a local increase in the flow area in the pipe system in the downpipe corresponding to the flow cross section $\delta_3$. However, the flow cross sections of the pipe system in other parts, which other parts constitute at least 75%, preferably at least 90%, of the total length of the pipe system between its inlet and outlet, are preferably designed in such a manner that these other parts have a flow cross section which does not exceed the flow cross section $\delta_2$. The total length of the downpipe, $L_1$, in the vertical direction is:

$$L_1 \geq 2.0 \cdot d_2 \text{ and } L_1 \geq 1.5 \cdot d_3.$$

In a suitable embodiment of a relatively large pressurized disc filter with fourteen discs of a diameter of 3 m, where the maximum flow of lime sludge is 0.095 m³/s, the collecting pipe has a diameter of roughly 700 mm, the downpipe has a diameter of roughly 900 mm, and the outlet has a diameter of roughly 200 mm. In the case of smaller filters with a lower capacity, in particular the diameter of the downpipe can be reduced further according to the table below:

|  | Number of discs Ø = 3 m | | | | |
| --- | --- | --- | --- | --- | --- |
|  | 6 | 8 | 10 | 12 | 14 |
| Max. flow lime sludge (m³/s) | 0.041 | 0.054 | 0.068 | 0.081 | 0.095 |
| Downpipe Ø (mm) | 600 | 700 | 800 | 900 | 900 |

The height of the downpipe is suitably greater than its diameter, appropriately between 1800 and 2200 mm for a 900 mm diameter, and 1000 and 1500 for a 600 mm diameter. When smaller filters are used, with smaller diameters, the collecting pipe and the outlet pipe can of course be made smaller, but with essentially the same proportions as in the case with 3 m discs.

However, the pipe system does not have to have a circular cross section in all its parts, but can also have an oval or rectangular cross section.

In order to avoid the lime sludge sedimenting in the outlet from the downpipe, the lower part of the downpipe is designed with an essentially continuous conical transition from the third flow cross section $\delta_3$ of the downpipe to the fourth flow cross section $\delta_4$ in the feed-out opening which follows for the lime sludge received.

A level meter 21 is suitably connected to the downpipe, which meter is in turn coupled to a regulating unit 22 which is finally connected to the regulating valve 20. In this way, the level of the lime sludge can be regulated depending on the signal from the level meter, or alternatively with regulation by an adjustable pump. The pump can be adjusted by, for example, either displacement regulation or speed regulation.

The valve 22, or alternatively a pump (not shown), forms a counterpressure-generating means t in the feed-out opening 30 from the filter for the purpose of maintaining the pressure in the filter.

In order to maintain a uniform and continuous flow in a minimized system without mechanical agitators, the relationship between the third flow cross section $\delta_3$ in the downpipe and the second flow cross section $\delta_2$ of the collecting pipe is:

$\delta_3 \leq 4.5 \cdot \delta_2$ and preferably $\delta_3 \leq 4 \cdot \delta_2$.

At the same time, the relationship between the fourth flow cross section $\delta_4$ in the outlet and the second flow cross section $\delta_2$ is:

$\delta_4 \leq 0.3 \cdot \delta_2$ and preferably $\delta_4 \leq 0.2 \cdot \delta_2^2 \cdot \delta_2$.

In order to reduce the risk of sedimentation in the pipe system further, a conventional recirculation system 12 is connected to the pipe system, the inlet 12a of the recirculation system being arranged after the connection of the last chute to the pipe system, seen in the feed-out direction of the lime sludge through the pipe system, and an outlet 12b being arranged in front of the connection of the first chute to the pipe system. A pump 12c is arranged in the recirculation system for recirculation of a part quantity of diluted lime sludge from its inlet to its outlet. The inlet 12a of the recirculation system is suitably arranged at the lowest point of the pipe system, which is after the level measuring tank 14 in the embodiment shown.

The pump 12c, preferably a sludge pump resistant to wearing material, is preferably driven continuously at constant speed during the majority of the operating time of the filter, the diluted lime sludge being kept in boosted circulation so that sedimentation is counteracted more effectively.

Figure 3:
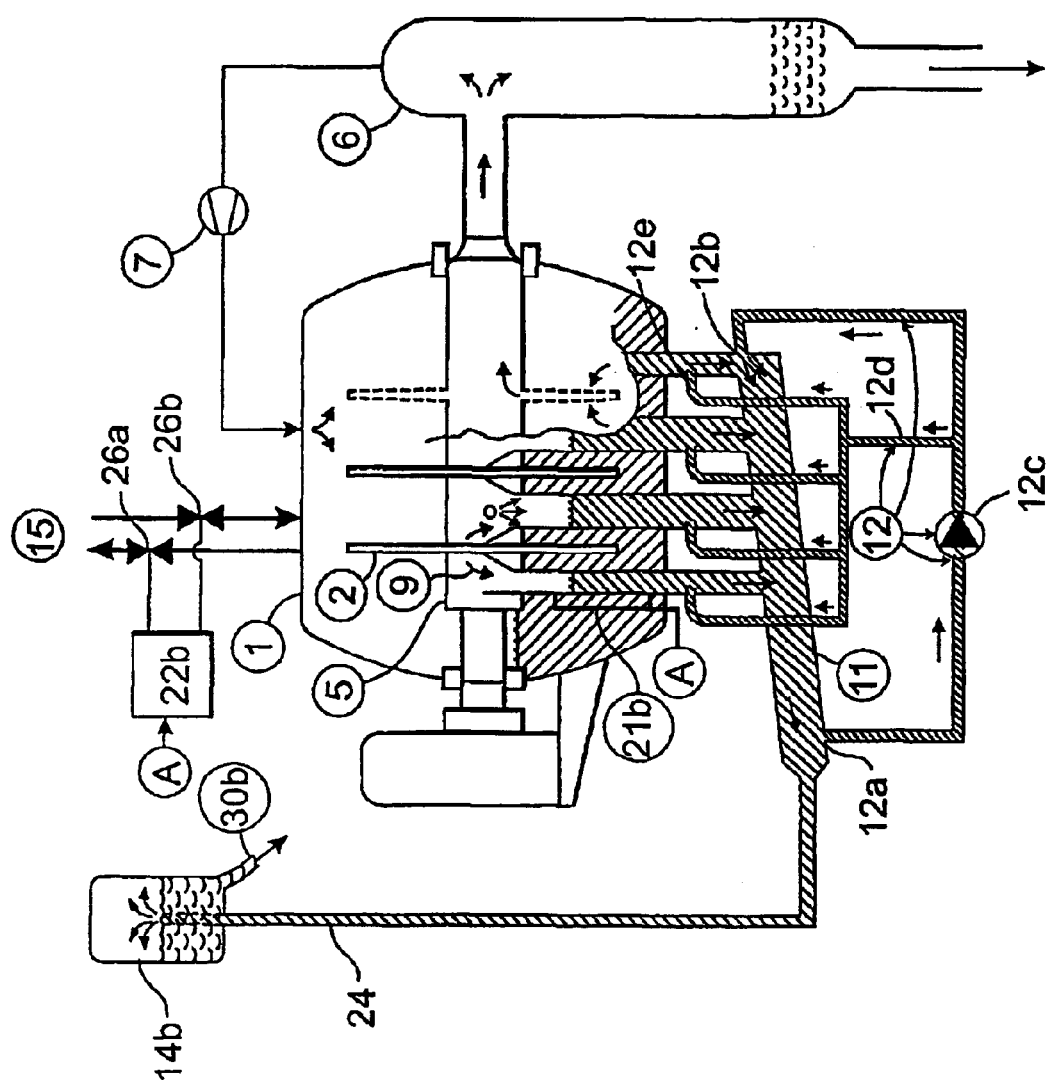
FIG. 3 shows a second variant of the invention.
Figure 4:
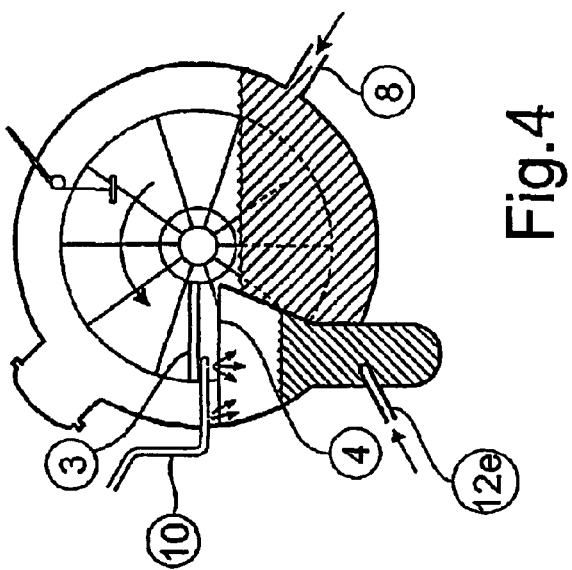
FIG. 4 shows a side view of the white liquor filter in FIG. 3.

FIG. 3 shows a second variant of a pressurized white liquor filter according to the invention in cross section. Those components of the filter which have the same function as those shown in FIGS. 1 and 2 have the same reference numbers, and are not described further. In this variant, the pipe system is adapted so that the counterpressure-generating means in the pipe system feed-out opening 30b of the pressure filter instead consists of a rising pipe which opens at a level above the level of the unfiltered white liquor mixed with lime sludge in the filter. By regulating the pressure in the filter, it is possible to maintain the desired level of lime sludge in the receiving chutes 4a. The level measuring tank 14 from FIG. 1 is thus omitted. In FIG. 3, the level is instead measured in the receiving chutes 4a via a level meter 21b, the signal A from which is sent to a regulating unit 22b. The regulating unit acts on valves 26a/26b, by which the overpressure in the filter and thus the filtration flow through the filter can be regulated. The level 30b at which the lime sludge can be fed out in the variant with a rising pipe corresponds to a raised level relative to the level of the unfiltered liquid in the filter. The maximum raised level corresponds to the maximum pressure level inside the filter minus the pressure losses in the pipe system.

A modified recirculation system 12 in FIG. 3 is connected to the pipe system, the inlet 12a of the recirculation system being arranged after the connection of the last chute to the pipe system, seen in the feed-out direction of the lime sludge through the pipe system, and an outlet 12b being arranged in front of the connection of the first chute to the pipe system. A pump 12c is arranged in the recirculation system for recirculation of a part quantity of diluted lime sludge from its inlet to its outlet. The inlet 12a of the recirculation system is arranged at the lowest point of the pipe system, which is after the level measuring tank 14 in the embodiment shown. In contrast to the recirculation system shown in FIG. 1, at least one second outlet 12e is also arranged so as to open in each receiving chute 4a at a level between its receiving opening 4 and its connection to the pipe system. Each outlet 12e is provided with recirculated diluted lime sludge via the branch 12 from the pressure side of the pump 12c. In this way, a boosted flow is obtained through the receiving chutes as well, as a result of which the risks of sedimentation and clogging in the receiving chutes are also reduced.

The invention can be modified in a number of ways within the scope of the accompanying patent claims, among which the following modifications may be considered.

For example, the recirculation system may comprise only the outlet 12e in each receiving chute, the outlet 12b being omitted. Control of the desired quantities in each outlet is preferably effected by suitable dimensioning of the cross section of the flow ducts in the recirculation system.

The most upstream receiving chute, seen in the feed-out direction of the lime sludge, or the outlet 12b, can also be provided with a flow duct of maximum cross section, so that a strong basic flow of recirculated lime sludge is developed at the start of the pipe system.

In the variant with a rising pipe 24, the inlet 12c can be connected directly below this rising pipe, as some sedimentation of the lime sludge can take place during onward transport upwards in the rising pipe 24.

The recirculation system shown can also be supplemented with air or water, and also air/water mixtures, being intermixed or substituted.

The circulation flow of lime sludge does not necessarily have to be taken from the lowest point in the system either, although this is preferable.

In the variant shown in FIG. 3, the rising pipe 24 can be replaced by a regulating valve (or pump) in the same manner as in FIG. 1.

Depending on the nature of following systems, the level regulation in FIG. 3 with pressure regulation 26a/26b can also be used in the system shown in FIG. 1.

What is claimed is:

1. Pipe system for receiving and transporting lime sludge from a filter medium in a continuously operating pressurized filter in a causticizing process, where the filter comprises at least one filter element covered with filter medium and partially immersed in white liquor mixed with lime sludge, and where white liquor is separated from the lime sludge by withdrawal through the filter medium of the filter element, each filter element comprising stripping means interacting with the filter medium for freeing lime sludge accumulated on the filter medium, and where at least one receiving chute with a first flow cross section $\delta_1$ is arranged with a receiving opening under each stripping means and above the level of the white liquor mixed with lime sludge for receiving stripped lime sludge, which receiving chute comprises an arrangement for supplying dilution liquid to the lime sludge to obtain a lime sludge concentration exceeding 15%, preferably more than 20%, characterized in that each receiving chute is connected to a pipe system with a second flow cross section $\delta_2$, which system is common to the chutes, and in which the pipe system, from the connection of the receiving chutes to the feed-out opening of the pipe system, has a flow cross section which does not exceed a third flow cross section $\delta_3$ and which maintains the flow rate in the lime sludge so that sedimentation of the lime sludge does not take place, in which the pipe system, seen in the flow direction of the filtered lime sludge, from the connection of the receiving chutes to a feed-out opening of the pipe system, does not have a mechanical agitator, and in which the feed-out opening has a fourth flow cross section $\delta_4$ which constitutes the smallest flow cross section of the first, second, third and fourth flow cross sections, and in that a counterpressure-generating means is arranged in the feed-out opening for the purpose of maintaining the pressure in the filter.

2. Pipe system according to claim 1, characterized in that the relationship between the third flow cross section $\delta_3$ and the second flow cross section $\delta_2$ is:

$\delta_3 \leq 4.5 \cdot \delta_2$ and preferably $\delta_3 \leq 4.0 \cdot \delta_2$.

3. Pipe system according to claim 1, characterized in that the relationship between the fourth flow cross section $\delta_4$ and the second flow cross section $\delta_2$ is:

$\delta_4 \leq 0.3 \cdot \delta_2$ and preferably $\delta_4 \leq 0.2 \cdot \delta_2$.

4. Pipe system according to claim 1, characterized in that the counterpressure-generating means is an essentially vertically arranged rising pipe which opens at a level above the level of the accumulated lime sludge in the filter.

5. Pipe system according to claim 4, characterized in that a level meter is arranged in at least one receiving chute.

6. Pipe system according to claim 5, characterized in that the level meter is connected to regulating means for regulating the pressurization in the filter.

7. Pipe system according to claim 4, characterized in that a level meter (21) is arranged in the pipe system (11) in an essentially vertically upright downpipe with a local increase in the flow area in the downpipe corresponding to the flow cross section $\delta_3$, and in that the flow cross section of the pipe system in other parts, which other parts constitute at least 75% of the total length of the pipe system between its inlet and outlet (30), and also in these other parts has a flow cross section which does not exceed the flow cross section $\delta_2$.

8. Pipe system according to claim 7, characterized in that the length $L_1$ of the downpipe, in the vertical direction, is: $L_1 \geq 2.0 \cdot d_2$ and $L_1 \geq 1.5 \cdot d_3$, where $d_2$ is the maximum diameter in the pipe system where the flow cross section does not exceed $\delta_2$, and $d_3$ is the maximum diameter in the pipe system where the flow cross section does not exceed $\delta_3$.

9. Pipe system according to claim 7, characterized in that the lower part of the downpipe changes from the third flow cross section $\delta_3$ to the fourth flow cross section $\delta_4$ in the feed-out opening via an essentially continuous conical transition.

10. Pipe system according to claim 7, characterized in that the level meter (21) is connected to regulating means (22) for regulating the adjustable counterpressure-generating outlet valve (20).

11. Pipe system according to claim 1, characterized in that a recirculation system is connected to the pipe system (11, 14), the inlet (12a) of the recirculation system being arranged after the connection of the last receiving chute to the pipe system, seen in the feed-out direction of the lime sludge through the pipe system, and an outlet (12b) being arranged in front of the connection of the first receiving chute to the pipe system, and a pump (12c) being arranged in the recirculation system for recirculation of a part quantity of diluted lime sludge from the inlet of the recirculation system to its outlet.

12. Pipe system according to claim 11, characterized in that at least one of water, gas or compressed air is added to the recirculation of diluted lime sludge.

13. Pipe system according to claim 11, characterized in that at least one second outlet (12e) is arranged so as to open in each receiving chute at a level between its receiving opening and its connection to the pipe system.

14. Pipe system according to claim 11, characterized in that the inlet of the recirculation system is arranged at the lowest point of the pipe system.

15. Pipe system according to claim 1, characterized in that the counterpressure-generating means is an adjustable outlet valve (20) or an adjustable pump.

16. Pipe system according to claim 1, characterized in that the filter consists of at least two disc filters (2) covered with filter medium and arranged on a hollow rotating shaft (5), where white liquor is separated from the lime sludge by withdrawal through the filter medium of the disc filter element and is conveyed out of the filter via the hollow shaft, each disc filter element comprising stripping means (3) interacting with the filter medium for freeing lime sludge accumulated on the filter medium, and where a receiving chute (4a) is arranged with a receiving opening under each stripping means.

* * * * *